US010397126B2

United States Patent
Jin et al.

(10) Patent No.: US 10,397,126 B2
(45) Date of Patent: Aug. 27, 2019

(54) VXLAN PACKET TRANSMISSION

(71) Applicant: HANGZHOU H3C TECHNOLOGIES CO., LTD., Binjiang District, Hangzhou, Zhejiang (CN)

(72) Inventors: Xiaoting Jin, Beijing (CN); Wei Wang, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/546,059

(22) PCT Filed: Jan. 29, 2016

(86) PCT No.: PCT/CN2016/072694
§ 371 (c)(1),
(2) Date: Jul. 25, 2017

(87) PCT Pub. No.: WO2016/119733
PCT Pub. Date: Aug. 4, 2016

(65) Prior Publication Data
US 2018/0013687 A1     Jan. 11, 2018

(30) Foreign Application Priority Data
Jan. 29, 2015   (CN) .......................... 2015 1 0046196

(51) Int. Cl.
*H04L 12/28*    (2006.01)
*H04L 12/805*   (2013.01)
(Continued)

(52) U.S. Cl.
CPC .......... *H04L 47/36* (2013.01); *H04L 12/4641* (2013.01); *H04L 49/3072* (2013.01); *H04L 2212/00* (2013.01)

(58) Field of Classification Search
CPC . H04L 12/4641; H04L 47/36; H04L 49/3072; H04L 2212/00
See application file for complete search history.

(56) References Cited

U.S. PATENT DOCUMENTS

2008/0075073 A1*   3/2008   Swartz ................. H04L 63/162
                                                  370/389
2009/0003241 A1*   1/2009   Teng ................... H04L 41/0659
                                                  370/254

(Continued)

FOREIGN PATENT DOCUMENTS

| CN | 102970227 A | 3/2013 |
| CN | 103532672 A | 1/2014 |

OTHER PUBLICATIONS

International Search Report and Written Opinion, International Application No. PCT/CN2016/072694, dated Mar. 24, 2016, pp. 1-7, SIPO.

(Continued)

*Primary Examiner* — Chi H Pham
*Assistant Examiner* — Fahmida S Chowdhury
(74) *Attorney, Agent, or Firm* — Hewlett Packard Enterprise Patent Department

(57) ABSTRACT

In an example, a SDN controller may acquire a path maximum transmission unit (PMTU) of a Virtual Extensible Local Area Network (VXLAN) tunnel from a source VXLAN tunnel end point (VTEP) to a destination VTEP of a data packet, and may transmit a control entry to the source VTEP in such a way that an individual VXLAN packet has a length within the packet length corresponding to the PMTU.

12 Claims, 4 Drawing Sheets

(51) Int. Cl.
*H04L 12/46* (2006.01)
*H04L 12/935* (2013.01)

(56) References Cited

U.S. PATENT DOCUMENTS

| | | | | |
|---|---|---|---|---|
| 2011/0103399 | A1* | 5/2011 | Bransi | H04L 12/4633 |
| | | | | 370/470 |
| 2013/0329728 | A1 | 12/2013 | Ramesh | |
| 2014/0233565 | A1* | 8/2014 | Mahapatra | H04L 45/74 |
| | | | | 370/392 |
| 2014/0269277 | A1* | 9/2014 | DeCusatis | H04L 47/365 |
| | | | | 370/230 |
| 2015/0288603 | A1* | 10/2015 | Kandasamy | H04L 45/74 |
| | | | | 370/392 |

OTHER PUBLICATIONS

Mogul et al., Path MTU Discovery, Network Working Group, Request for Comments: 1191, Obsoletes: RFC 1063, Nov. 1990, pp. 1-19.
Reyk Floeter, VXLAN and Cloud-based networking with OpenBSD, AsiaBSDCon Proceedings, Mar. 16, 2014, pp. 91-95.

* cited by examiner

VXLAN PACKET TRANSMISSION

BACKGROUND

Nowadays, cloud computing is used for constructing information networks of enterprises, and virtualization technology may be employed and deployed in cloud computing. A Software Defined Network (SDN) is a solution for virtualization. The SDN may separate the control plane from a forwarding plane in the network, which for example may allow a centralized controller to implement various policies for various forwarding behaviors in the network. Thus, a forwarding device may forward a flow according to a flow entry distributed from the controller.

DETAILED DESCRIPTION OF THE EMBODIMENTS

The SDN may be implemented based on a specific interface, Overlay network or open protocol. The Overlay represents a virtualization technology to realize virtualization by encapsulating a packet (or data frame) into another packet.

VXLAN is a kind of Overlay protocol used, and VXLAN is used to construct a large two-layer (hereinafter, referred to as "layer-2" or "L2") data center based on a three-layer (hereinafter, referred to as "layer-3" or "L3") IP network. A data center is responsible for providing one or more service functions, and the reliability of VXLAN may become one of the critical factors which have effect on services.

The VXLAN technology may adopt a network identifier of 24 bits and at most 16,000,000 virtual networks which are isolated from each other may be built accordingly. The VXLAN can make the best of existing L3 IP network technology, such as using a equal-cost routing to balance multi-path load distribution and using IP multicasting to broadcast or multicast Ethernet packet. The VXLAN technology may encapsulate a layer-2 packet into a VXLAN packet by using Media Access Control (MAC) in User Datagram Protocol (UDP). The format of the VXLAN packet may be as illustrated in the table 1:

TABLE 1

| Outer MAC Header | Outer IP Header | Outer UDP Header | VXLAN Header | Original L2 Frame |
| --- | --- | --- | --- | --- |

In Table 1, the maximum lengths of the outer MAC header, the outer IP header, the outer UDP header, and the VXLAN header may be 14 bytes, 20 bytes, 8 bytes, and 8 bytes, respectively. In this way, the VXLAN packet may be 50 bytes longer than the original L2 frame.

A host may access a VXLAN through a VTEP. The host may be a virtual machine (VM), and may also be a physical host. VTEPs belonging to the same VXLAN may communicate with each other through a tunnel termed as a VXLAN tunnel, and the VXLAN tunnel may transmit a VXLAN packet through an Underlay network. As an edge device of VXLAN, the VTEP may encapsulate a layer-2 packet from a source host into a VXLAN packet and transmit the VXLAN packet to a distant VTEP through a VXLAN tunnel. Subsequently, the distant VTEP may de-capsulate the VXLAN packet and forward it to a destination host. The VTEP may be built on a server or a network device, may be built as a separate physical device (such as a switch having a function as the VTEP), or may be built on the same server with the VM to which the VTEP is accessed.

Figure 1:
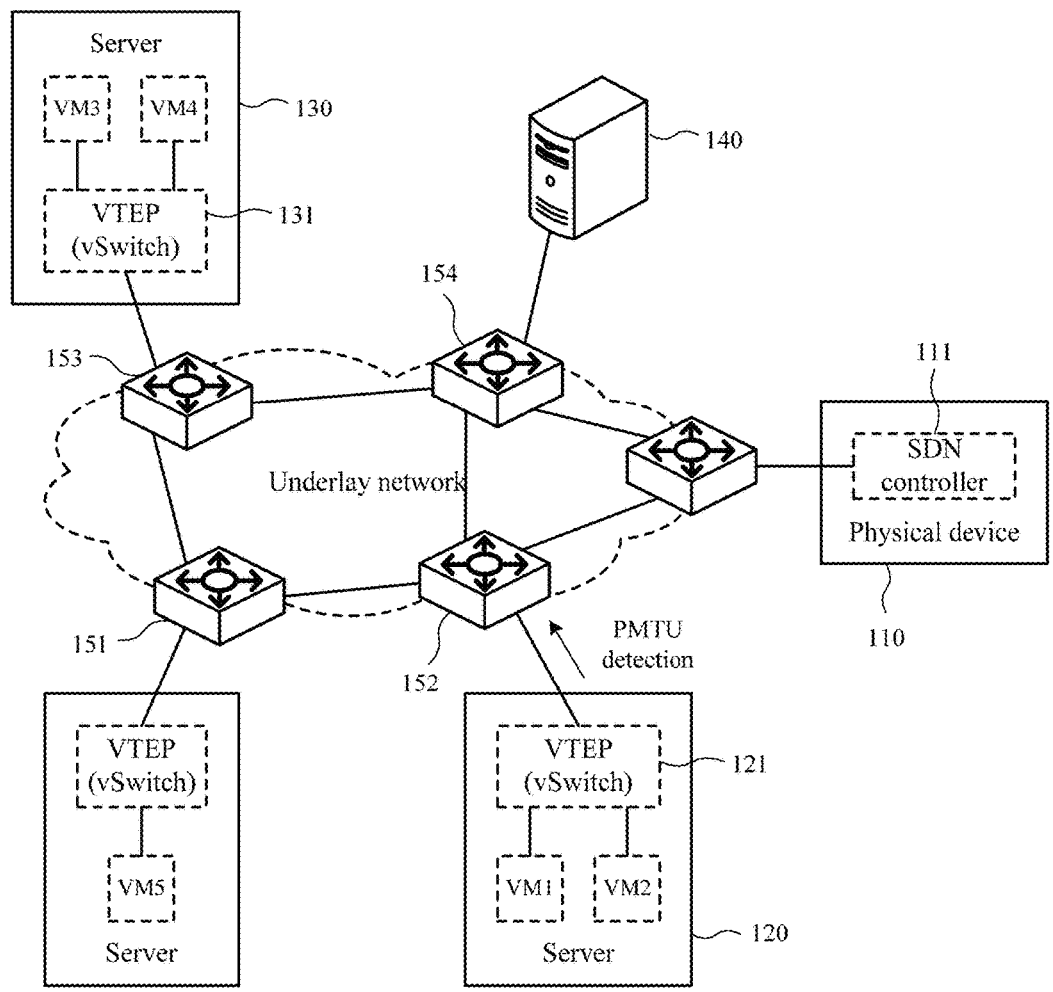
FIG. 1 illustrates a network structure of a virtual extensible local area network (VXLAN) according to an example of the disclosure.

FIG. 1 illustrates a structure of VXLAN according to an example. VM 1, VM 2 and VTEP 121 may be implemented on server 120. VTEP 121 may be a vSwitch (virtual Switch), and may be used as an access equipment to access VM1 and VM2 to the VXLAN. VM 3, VM 4 and VTEP 131 may be implemented on server 130. VTEP 131 may be used as an access equipment to access VM 3 and VM 4 to the VXLAN. VM 1 and VM 3 may access to VXLAN 10, and VM 2 and VM 4 may access to VXLAN 20. VMs accessing to the same VXLAN may be considered as belonging to the same layer-2 network, and communicate with each other on layer-2. VMs accessing to different VXLANs may communicate with each other by layer-3 forwarding with a VXLAN IP Gateway (GW), such as VXLAN IP GW 140 in FIG. 1. The VXLAN IP GW 140 may also connect to a network which is not VXLAN (not illustrated in FIG. 1) and perform packet forwarding between the VXLAN and the network which is not VXLAN. Thus, the VXLAN IP GW can be a VTEP having a function of layer-3 forwarding. SDN controller 111 operating on a physical device 110 may build a security channel with each of the above-mentioned devices and perform message interaction with each other, so as to implement functions such as distributing a flow entry, querying or reporting a state.

A VXLAN tunnel between VTEP 121 and VTEP 131 may be across the Underlay network transparently, and a packet transmitted through the VXLAN tunnel may be forwarded by a network device in the Underlay network, thus non-SDN network devices in the Underlay network may be utilized. The interface of a network device in the Underlay network may restrict the length of a packet to pass the interface. For example, the maximum length allowed for a packet may be associated with several factors such as hardware configuration of the interface and the transportation protocol supported by the interface. In one case, when the length of an original packet exceeds the allowed maximum length, the packet may be fragmented into fragments. Each of the fragments may be encapsulated into a packet of a length within the allowed maximum length, and subsequently transmitted to a destination node and re-combined as the original packet on the destination node. The above process may be called "fragmentation", and the fragmented packets may be "fragments". In another case, when the length of an original packet exceeds the allowed maximum length, if the packet can be uploaded to the processor of the network device, the packet may be fragmented by the processor and then the fragments may be transmitted to a destination node; and if the packet will be forwarded according to a MAC address entry rather than being uploaded to the processor, the packet may be discarded for its over length.

For more efficient data transmission, the length of a data packet may be as large as possible. However, if a packet is discarded due to over length, the reliability of the network may be reduced. For a VXLAN packet with an additional encapsulated header of 50 bytes, its length may be most likely to exceed the allowed maximum length, which will reduce the reliability of forwarding packet through Underlay network.

Figure 2:
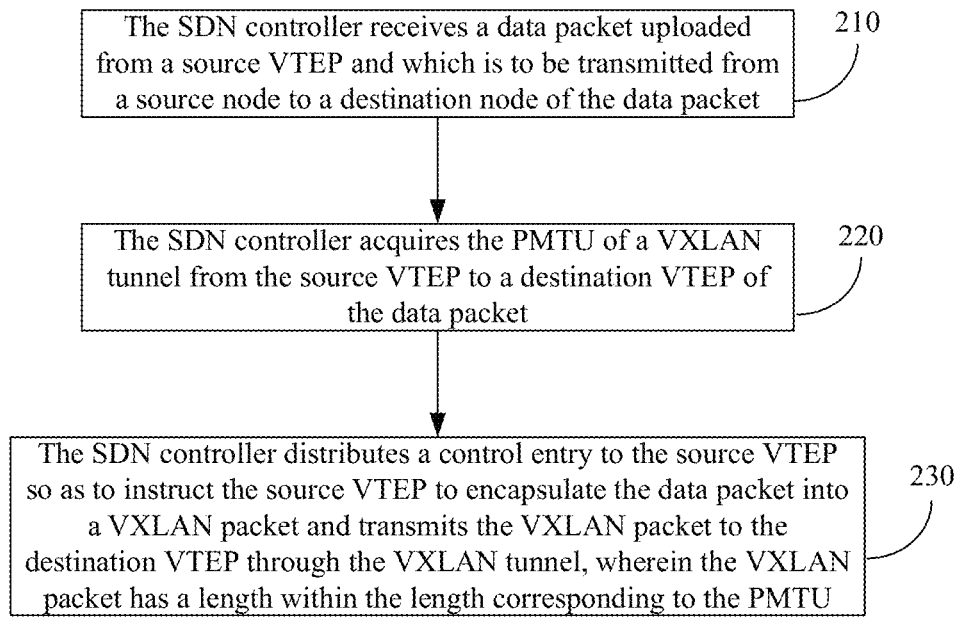
FIG. 2 is a flowchart illustrating a method for transmitting a VXLAN packet on a SDN controller according to an example of the disclosure.

In one example of the disclosure, a method for transmitting a VXLAN packet can reduce discarding packet caused by over length, so as to improve the reliability of network. The flowchart of the method applied on the SDN controller may be as illustrated in FIG. 2.

At block 210, the SDN controller may receive a data packet which is uploaded from a source VTEP and which is to be transmitted from a source node to a destination node of the data packet.

In examples of the disclosure, the data packet may not be a network control protocol packet to transfer information such as network-related parameters and state. A VTEP to access the source node of a data packet into a VXLAN may be referred to as the source VTEP of the data packet, and a VTEP to access the destination node of a data packet into a VXLAN may be referred to as the destination VTEP of the data packet.

When a VTEP receives a data packet from a source node, if the data packet cannot match any entry in a flow table, the data packet may be uploaded onto a SDN controller.

At block 220, the SDN controller may acquire the path maximum transmission unit (PMTU) of a VXLAN tunnel from the source VTEP to the destination VTEP of the data packet.

The SDN controller may store information about devices (such as VMs, VTEPs, and VXLAN IP GWs) managed in the management domain of the SDN controller. For example, the information may include IP address of a VM, MAC address of the VM, VTEP to which the VM is connected, and VXLAN to which the VM belongs, MAC address and IP address of the VTEP, and VXLAN to which the VTEP belongs. The information may also be stored on a cloud platform to which the SDN controller can access. According to the information, the SDN controller may determine the destination VTEP which accesses the destination node of the data packet to the VXLAN.

The maximum link layer load (or referred to as layer-3 data packet) which is allowed to pass the network device without fragmentation may be referred to as a maximum transmission unit (MTU). The maximum link layer load which can be transmitted from a source node to a destination node without fragmentation may be referred to as a PMTU. The PMTU of a path equals to, in numerical value, the minimum MTU restricted by interfaces of all network devices along the path.

In the examples of the disclosure, unless otherwise indicated, a packet means a link layer packet, and a packet length means the length of a link layer packet. For example, the packet length corresponding to PMTU may be equal to a sum of PMTU and the length of link layer encapsulation, and the packet length for an Ethernet packet may be equal to a sum of PMTU and 14 bytes, which does not include the check field at the end of the link layer packet. For example, the length of a VXLAN packet means the number of bytes obtained by encapsulating a data packet as UDP load with a VXLAN header, an outer UDP header, an outer IP header and an outer MAC header.

The SDN controller may acquire a PMTU of the VXLAN tunnel from the source VTEP to the destination VTEP in various ways. For example, the SDN controller may distribute at least one flow entry for PMTU detection to the source VTEP. The flow entry for PMTU detection may instruct the source VTEP to transmit a fragmentation-inhibited detection packet to the destination VTEP in order to perform a PMTU detection with respect to the destination VTEP. The fragmentation-inhibited detection packet represents a detection packet on which a fragmentation is not allowed to perform, and the length of the detection packet may be a designated value or determined according to a predetermined rule. The detection packet may be an Internet Control Message Protocol (ICMP) packet, and may also be other type of control packet or data packet. If the packet length, corresponding to MTU of the interface of a network device on the path from a source VTEP to a destination VTEP, is less than the length of the detection packet, the network device may return an ICMP error control packet to the source VTEP. The ICMP error control packet may inform the source VTEP that the detection packet fails to reach the destination VTEP. When receiving the ICMP error control packet, the source VTEP may report the reception to the SDN controller according to a flow entry distributed from the SDN controller. Thus, the SDN controller may acquire a PMTU of the VXLAN tunnel from the source VTEP to the destination VTEP. In particular, the SDN controller may employ following two examples to acquire the PMTU.

One Example

The SDN controller may distribute a control packet uploading flow entry to the source VTEP, so as to instruct the source VTEP to upload a received ICMP error control packet to the SDN controller. However, some vSwitches and SDN-supporting forwarding devices may be set by default to upload an ICMP error control packet to the SDN controller. And for such devices, the distribution for a control packet uploading flow entry may be omitted.

The SDN controller may distribute a PMTU detection flow entry to the source VTEP, so as to instruct the source VTEP to transmit a fragmentation-inhibited detection packet to the destination VTEP. The fragmentation-inhibited detection packet has a MTU of a designated length. The designated length may correspond to the maximum value of MTU defined by the network between the source VTEP and the destination VTEP. The SDN controller may start a timer when distributing the PMTU detection flow entry.

When the fragmentation-inhibited detection packet passes through a network device on the path from the source VTEP to the destination VTEP, if the MTU of the interface of the network device is less than the designated length, the network device may discard the fragmentation-inhibited detection packet and return an ICMP error control packet to the source VTEP so as to inform the source VTEP that the fragmentation-inhibited detection packet cannot reach its destination. The MTU of the interface of the network device may also be carried in the ICMP error control packet. The source VTEP may upload the received ICMP error control packet to the SDN controller.

If an ICMP error control packet indicating that the fragmentation-inhibited detection packet cannot reach its destination is received from the source VTEP before the timer expires, the SDN controller may distribute a new PMTU detection flow entry to the source VTEP and reset the timer. The new PMTU detection flow entry may instruct the source VTEP to transmit a new fragmentation-inhibited detection packet with a MTU of a new designated length to the destination VTEP. The new designated length may be the same as the MTU carried in the ICMP error control packet. And the SDN controller may repeat the above process until the timer expires. If the timer expires, the SDN controller may determine that the fragmentation-inhibited detection packet transmitted from the source VTEP reaches the destination VTEP. And thus, once the timer expires, the SDN controller may determine the MTU carried in the last one of ICMP error control packets uploaded from the source VTEP as the PMTU of the VXLAN tunnel, and the process may end.

On the other hand, if none ICMP error control packet is uploaded from the source VTEP before the timer expires, the SDN controller may determine the designated length of MTU in the fragmentation-inhibited detection packet as the PMTU of the VXLAN tunnel.

In the above way, the SDN controller may distribute a PMTU detection flow entry to instruct the source VTEP to generate and transmit a fragmentation-inhibited detection packet. When receiving an ICMP error control packet indicating that the fragmentation-inhibited detection packet cannot reach its destination, the SDN controller may distribute a new PMTU detection flow entry, so as to instruct the source VTEP to regenerate and transmit a new fragmentation-inhibited detection packet according to a designated rule for determining the packet length, such as according to the MTU carried in the ICMP error control packet.

Another Example

The SDN controller may distribute a control packet uploading flow entry to the source VTEP, so as to instruct the source VTEP to upload received ICMP error control packet or response packet for responding to a detection packet onto the SDN controller. If a device is set by default to upload the ICMP error control packet or the response packet, this process may be omitted.

The SDN controller distributes a PMTU detection flow entry to the source VTEP, so as to instruct the source VTEP to transmit a fragmentation-inhibited detection packet to the destination VTEP. The fragmentation-inhibited detection packet has a MTU of a designated length. The designated length may correspond to the maximum value of MTU defined by the network between the source VTEP and the destination VTEP. When receiving the detection packet, the destination VTEP may reply the source VTEP with a response packet. The detection packet and its response packet may be defined according to various protocols. For example, the detection packet may be an ICMP request packet and its response packet may be an ICMP response packet. The detection packet and its response packet may also adopt a self-defined packet interaction mode.

If the length of the detection packet exceeds the packet length corresponding to MTU of the interface of a network device on the path from the source VTEP to the destination VTEP, the network device may discard the detection packet, and return an ICMP error control packet to the source VTEP to inform the source VTEP that the detection packet cannot reach its destination. The MTU of the interface of the network device may be carried in the ICMP error control packet. The source VTEP may upload the received ICMP error control packet onto the SDN controller. If an ICMP request packet arrives at the destination VTEP, the destination VTEP may return a response packet to the source VTEP, and the source VTEP may upload the received response packet onto the SDN controller.

When receiving from the source VTEP an ICMP error control packet which indicates that the detection packet cannot reach its destination VTEP, the SDN controller may distribute a new PMTU detection flow entry to the source VTEP again. The new flow entry may instruct the source VTEP to transmit a fragmentation-inhibited detection packet to the destination VTEP. The fragmentation-inhibited detection packet may have the same MTU with the MTU carried in the ICMP error control packet. The SDN controller may repeat the above process until it receives a response packet for responding to the detection packet from the source VTEP.

The SDN controller may determine the MTU carried in the ICMP error control packet, which was lastly transmitted from the source VTEP and which indicates that the detection packet cannot reach its destination, as the PMTU of the VXLAN tunnel. If the SDN controller has not received such an ICMP error control packet from the source VTEP before receiving the response packet, the SDN controller may determine the designated length as the PMTU of the VXLAN tunnel.

In this way, the SDN controller may distribute a flow entry to instruct the source VTEP to generate and transmit a detection packet. When receiving an ICMP error control packet indicating that the detection packet cannot reach its destination, the SDN controller may distribute a new flow entry to instruct the source VTEP to regenerate and transmit another detection packet according to the MTU in the ICMP error control packet. And the SDN controller may repeat this process until a response packet to the detection packet is received.

In another example, the SDN controller may also send to the network management server a request for PMTU detection of the link having the VTEP IP address of the source VTEP as the source address and the VTEP IP address of the destination VTEP as the destination address. And then the network management server may instruct the device on which the source VTEP is located to perform PMTU detection and return the result of PMTU detection to the SDN controller.

At block 230, the SDN controller may distribute a control entry to the source VTEP so as to instruct the source VTEP to encapsulate a data packet transmitted from the source node into a VXLAN packet and transmit the VXLAN packet to the destination VTEP through the VXLAN tunnel, wherein the VXLAN packet has a length within the packet length corresponding to the PMTU.

The SDN controller may instruct the source VTEP to complete the block 230 by distributing a flow entry.

If a data packet is subjected to VXLAN-encapsulation and the encapsulated packet has a length exceeding the packet length corresponding to the PMTU, the SDN controller may perform fragmentation for the data packet or the VXLAN-encapsulated packet (may also be referred to as VXLAN packet), so as to obtain individual fragmented VXLAN packets having a length within the packet length corresponding to the PMTU. According to a protocol based by the VXLAN, fragmentation may be performed on a layer of a 7 layer model defined by the protocol. In an Ethernet, fragmentation of a packet may be performed on layer-3 (the IP layer). By the fragmentation, a layer-3 data packet may be fragmented into at least two fragments. Each fragment may be link-layer encapsulated so as to obtain a packet whose layer-3 header may carry information for recombining the fragments. And the number of the obtained packets corresponds to the number of the fragments. As an example, the following gives description for a case that adopts an Ethernet as a basic network protocol of VXLAN.

Since a VXLAN packet is encapsulated in MAC-in-UDP, fragmentation may be performed for the VXLAN packet or for a data packet carried within the VXLAN packet. When fragmentation is performed for the VXLAN packet, it is an outer layer-3 data packet to be fragmented. The outer layer-3 data packet is formed by encapsulating a data packet carried within the VXLAN packet with a VXLAN header, an outer UDP header and an outer IP header, and is named with respect to an inner layer-3 data packet carried in the VXLAN packet. The VXLAN packet may be fragmented with the PMTU being a maximum fragment unit, so that the length of the fragmented VXLAN packet does not exceed the packet length corresponding to the PMTU. On the other hand, when fragmentation is performed for the data packet, the value of PMTU minus length of the outer IP header minus length of the outer UDP header minus length of the VXLAN header minus length of layer-2 encapsulation of the data packet may be used as the maximum fragment unit, so that, after VXLAN encapsulation, the length of the fragmented data packet does not exceed the packet length corresponding to the PMTU. The following gives an example of fragmentation for the data packet.

In one example, the SDN controller may distribute configurations related to fragmentation for the data packet to the source VTEP according to a network management protocol, and instruct the source VTEP to VXLAN-encapsulate and transmit the data packet by distributing a flow entry through a SDN management channel.

For example, the SDN controller may distribute a VXLAN flow entry and its global index identifier (ID) to the source VTEP according to SDN management protocol such as OpenFlow protocol. The VXLAN flow entry is to instruct the source VTEP to encapsulate a data packet which is to be transmitted from the source node to the destination node of the data packet into a VXLAN packet and transmit the VXLAN packet to the destination VTEP through the VXLAN tunnel. Meanwhile, the SDN controller may further distribute the global index ID and its corresponding PMTU to the source VTEP according to a network management configuration protocol such as Open vSwitch Database (OVSDB) configuration protocol or Netconf (network configuration protocol). The correspondence between the global index ID and the PMTU may ensure that: with respect to a data packet matching the flow entry having the global index ID, if the length of a VXLAN packet obtained by VXLAN-encapsulating the data packet exceeds the packet length corresponding to the PMTU, the source VTEP may fragment the data packet (referred to as "Over-size packet" hereinafter) into fragments before executing the flow entry. Then each fragment may be encapsulated into a new VXLAN packet, and the length of the new VXLAN packet does not exceed the packet length corresponding to the PMTU. The fragmented packet may be referred to as "Normal-size packet".

The SDN controller thereon may store non-aging flow entries which are generated and distributed by the SDN controller itself, and each of the flow entries has a one-to-one corresponding global index ID. Thus, the SDN controller may distribute a flow entry together with its global index ID. In this way, with respect to a device managed in the management domain of the SDN controller, each of the flow entries distributed to the device may have a different global index ID. When the SDN controller distributes a VXLAN flow entry and a PMTU applicable to the VXLAN flow entry to the source VTEP respectively in different ways, the source VTEP may match the VXLAN flow entry with the PMTU according to the global index ID.

Figure 3:
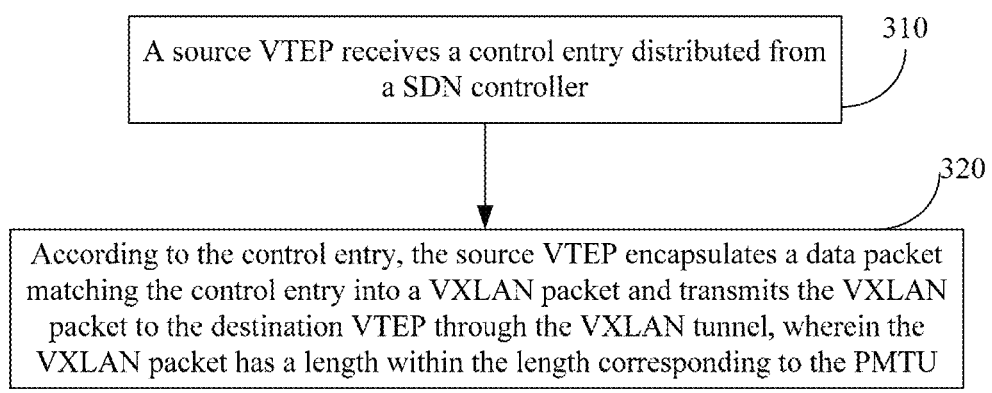
FIG. 3 is a flowchart illustrating a method for transmitting a VXLAN packet on a VXLAN tunnel end point (VTEP) according to an example of the disclosure.

The process on a source VTEP may be as illustrated in FIG. 3.

At block 310, a source VTEP may receive a control entry distributed from a SDN controller, and the control entry may include a PMTU of the VXLAN tunnel from the source VTEP to a destination VTEP.

At block 320, according to the control entry, the source VTEP may encapsulate a data packet matching the control entry into a VXLAN packet which has a length within the packet length corresponding to the PMTU. And the SDN controller may transmit the VXLAN packet to the destination VTEP through the VXLAN tunnel.

When receiving a data packet matching with the control entry, if the data packet is an Over-size packet, then the source VTEP may fragment the data packet, and each packet obtained by fragmentation of the data packet is a Normal-size packet. According to the control entry, the source VTEP may transmit a VXLAN packet of which the length does not exceed the packet length corresponding to the PMTU to the destination VTEP through the VXLAN tunnel.

In one example, the SDN controller may distribute a control entry by way of flow entry and network management.

The source VTEP may receive a VXLAN flow entry with a global index ID, which is distributed by the SDN controller according to SDN management protocol.

The source VTEP may also receive the global index ID of the VXLAN flow entry and a PMTU of the VXLAN tunnel, which are distributed from the SDN controller according to network management configuration protocol.

When received data packet matching the VXLAN flow entry with the global index ID, the source VTEP may fragment an Over-size received data packet into Normal-size packets before forwarding according to the flow entry.

When receiving a data packet, if the data packet matches a VXLAN flow entry, and a global index ID of the VXLAN flow entry has a corresponding PMTU, the source VTEP may further determine whether the sum of the length of the data packet and the length of the VXLAN encapsulation is larger than the packet length corresponding to the PMTU (i.e., the sum of the PMTU and the length of link layer encapsulation) or not. And if the determination result is YES, it means that the data packet is an Over-size packet and its VXLAN-encapsulated packet may have a length exceeding the maximum length allowed by the VXLAN tunnel from the source node to the destination node. At this time, the source VTEP may perform fragmentation for the data packet, in such a way that each fragment can be encapsulated not to exceed the packet length corresponding to the PMTU. The source VTEP may VXLAN encapsulate and forward each fragment according to the matching VXLAN flow entry. If the determination result is NOT, the data packet may be VXLAN encapsulated and forwarded according to the matching VXLAN flow entry.

The source VTEP may maintain the correspondence between the global index ID of the VXLAN flow entry and the PMTU locally. When a global index ID and its corresponding PMTU distributed from the SDN controller are received, the correspondence between the global index ID and its corresponding PMTU may be stored. When a VXLAN flow entry having a global index ID is deleted (for example, because of the aging of the flow entry or reception of a deletion instruction for the flow entry), the stored correspondence between the global index ID and the PMTU may also be deleted. In this way, if received data packet matches a flow entry, the source VTEP may query the stored correspondence. If the stored correspondence includes the global index ID of the flow entry, the received data packet may be determined whether to be an Over-size packet. And if it is an Over-size packet, the Over-size packet may be fragmented before encapsulation. And then the matching flow entry may be executed. If the stored correspondence does not include the global index ID of the flow entry, the matching flow entry may be directly executed.

In one example, in block 210, when receiving a data packet uploaded from the source VTEP, the SDN controller may determine whether it is a data packet of an important data flow which may request high quality of service according to a predetermined condition. If it is a data packet of an important data flow, the SDN controller may execute blocks 220 and 230, such that the data packet of an important data flow will not be discarded due to its over encapsulation length when transmitted through the VXLAN tunnel. If it is not a data packet of an important data flow, the SDN controller may skip blocks 220 and 230 to distribute the VXLAN flow entry to the source VTEP. The VXLAN flow entry may instruct the source VTEP to encapsulate an unimportant data packet which is to be transmitted from the source node to the destination node of the data packet into a VXLAN packet and transmit the VXLAN packet to the destination VTEP through a VXLAN tunnel. In this way, the load on the source VTEP can be reduced since the process for unimportant data flow may be reduced.

The predetermined condition for determining whether a data packet is of an important data flow may be set according to practical needs. The features of various fields of the data packet can be used as the predetermined condition. For example, one or more of source MAC address, source IP address, destination IP address, destination MAC address, and Transmission Control Protocol (TCP) port number of the data packet may be used as the predetermined condition.

The networking structure of the Underlay network may provide multiple forwarding paths for the VXLAN channel. Therefore, when a forwarding path fails, it may automatically switch to another forwarding path to continue the transmission for the flow of the VXLAN channel. Since the PMTU is restricted by the devices on the forwarding path, when the forwarding path in the Underlay network is changed, the PMTU value of the VXLAN channel may also change. For example, in the network illustrated in FIG. 1, the practical forwarding path of the VXLAN channel from VTEP 131 to VTEP 121 may be built on basis of forwarding devices 153, 151 and 152. When the forwarding device 151 fails, the Underlay network may automatically switch the VXLAN channel onto the forwarding path of the forwarding devices 153, 154 and 152, and the PMTU of the VXLAN channel may change. The SDN controller may learn the path change of the VXLAN channel in the Underlay network. At this time, the SDN controller may re-execute the block 220 to newly acquire the PMTU of the VXLAN channel and instruct the source VTEP of the VXLAN channel to update the PMTU with a newly acquired value.

In this example, the PMTU of the VXLAN channel may be acquired first, and according to the acquired PMTU, the packets having a length over the maximum length which is allowed for the transmission path of the VXLAN channel may be fragmented. In this way, a VXLAN packet can be avoided from being discarded due to its over length when forwarded, which improves the reliability of network.

In another example, SDN controller 111 may maintain an important data flow table which indicates a predetermined condition for determining whether a data packet is of an important data flow. In this example, the reality of forwarding of an important data flow will depend on a PMTU to be improved. The important data flow table may have a format as illustrated in Table 2.

TABLE 2

| Entry No. | Predetermined Condition |
|---|---|
| ⋮ | ⋮ |
| n | Source IP address of VM2-IP, Destination IP address of VM4-IP |
| ⋮ | ⋮ |

Figure 4:
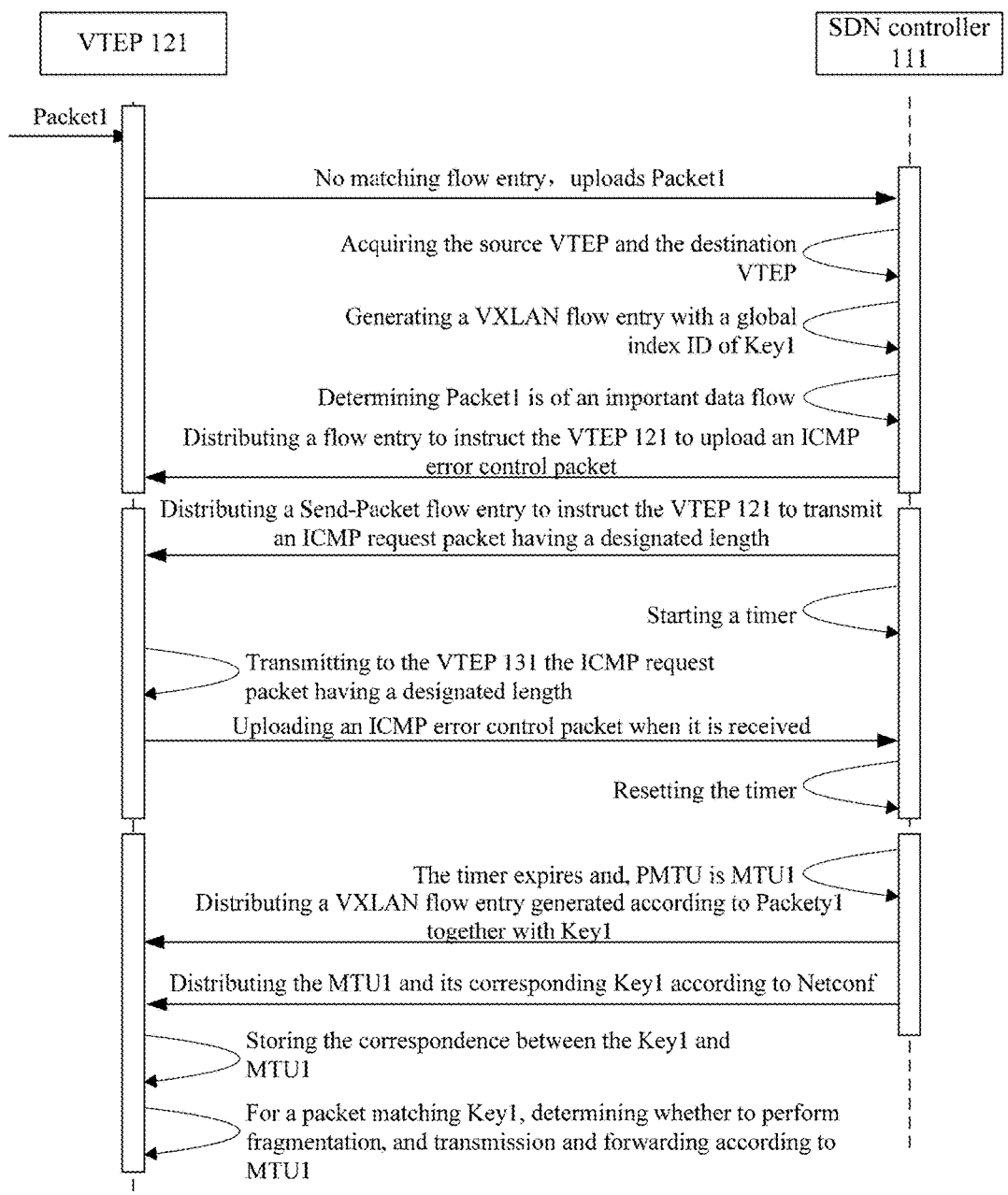
FIG. 4 is a flowchart illustrating a process for transmitting a VXLAN packet between a VTEP and a SDN controller in the network as shown in FIG. 1.

VM 2 may initiate communication with VM 4 and transmit a data packet, Packet1, to VM 4. The source IP address of the Packet1 may be the IP address VM2-IP of VM 2, and the destination IP address of the Packet 1 may be the IP address VM4-IP of VM 4. The Packet1 from VM 2 may arrive at VTEP 121 first, and the processes on VTEP 121 and SDN controller 111 are illustrated as in FIG. 4.

VTEP 121 may receive a data packet, Packet1, from VM 2.

VTEP 121 may query locally-stored flow entries to find that the Packet1 matches no flow entry, so VTEP 121 may upload the Packet1 onto SDN controller 111.

SDN controller 111 may receive the Packet1 uploaded from VTEP 121, extract the destination IP address of the Packet1, and learn that the destination node VM4 of the Packet1 accesses the VXLAN through VTEP 131 according to locally-stored information or information queried from cloud management platform. Therefore, the source VTEP of the Packet1 may be determined as VTEP 121 and the destination VTEP of the Packet1 may be determined as VTEP 131.

SDN controller 111 may generate a VXLAN flow entry according to the Packet1. The VXLAN flow entry may instruct to encapsulate a data packet having a source IP address of VM2-IP and a destination IP address of VM4-IP, into a VXLAN packet having an outer source IP address of IP-121, an outer destination IP address of IP-131 and a VXLAN tag of 20, and transmit the VXLAN packet to VTEP 131. In this example, IP-121 is the VTEP IP address of VTEP 121, IP-131 is the VTEP IP address of VTEP 131, and 20 is the tag of the VXLAN to which VM 2 and VM 4 belong. The VXLAN flow entry has a global index ID of Key1.

On the other hand, SDN controller 111 may query the table 2 to find that the Packet1 matches the $n^{th}$ entry, thus SDN controller 111 may learn that the Packet1 is a packet of an important data flow. Since the Packet1 is a packet of an important data flow, SDN controller 111 may distribute a flow entry to the source VTEP 121 to instruct VTEP 121 to upload an ICMP error control packet onto SDN controller 111. The ICMP error control packet may inform SDN controller 111 a packet cannot reach its destination VTEP. For example, the ICMP error control packet may have a destination IP address of IP-121, an ICMP-TYPE of 3 and an ICMP CODE of 4. Furthermore, for a data packet of an unimportant data flow, SDN controller 111 may distribute generated VXLAN flow entry to the VTEP which uploads the data packet, and the VTEP may process and forward the data packet according to the flow entry and the process ends.

SDN controller 111 may distribute a detection flow entry (such as a Send-Packet flow entry according to OpenFlow protocol) to source VTEP 121 to instruct VTEP 121 to transmit a fragmentation-inhibited ICMP request packet. The fragmentation-inhibited ICMP request packet may have a source IP address of IP-121, a destination IP address of IP-131 and a link layer load of 1500 bytes. The number "1500" is a preset value of MTU of a VXLAN link according to Ethernet protocol.

SDN controller 111 may start a timer when distributing the detection flow entry.

VTEP 121 may execute the Send-Packet flow entry distributed from SDN controller 111, and transmit an fragmentation-inhibited ICMP request packet to VTEP 131.

If before the timer expires, VTEP 121 receives an ICMP error control packet which indicates that the ICMP request packet cannot reach its destination address, it means that the MTU of the interface of a device on the forwarding path from VTEP 121 to VTEP 131 is less than the length of link layer load of the ICMP request packet. And the device may add the MTU of the interface into the ICMP error control packet to be transmitted to VTEP 121. According to a flow entry distributed from SDN controller 111, VTEP 121 may upload the ICMP error control packet onto SDN controller 111.

When receiving the ICMP error control packet uploaded from VTEP 121, SDN controller 111 may extract the MTU of the interface from the ICMP error control packet. Then SDN controller 111 may distribute a new Send-Packet flow entry to VTEP 121 again. The new Send-Packet flow entry may instruct VTEP 121 to transmit a new fragmentation-inhibited ICMP request packet. The new fragmentation-inhibited ICMP request packet may have a source IP address of IP-121, a destination IP address of IP-131 and a link layer load of the extracted MTU.

The SDN controller 111 may reset the timer when distributing the new Send-Packet flow entry.

SDN controller 111 and VTEP 121 may repeat the above detection process until the timer expires. The PMTU of the VXLAN tunnel from VTEP 121 to VTEP 131 is the length of link layer load designated by the Send-Packet flow entry which was lastly distributed before the timer expires. The detected PMTU is assumed to be MTU1.

SDN controller 111 may distribute a VXLAN flow entry generated according to the Packet1 to VTEP 121, and the VXLAN flow entry includes its global index ID Key1.

SDN controller 111 may distribute the detected MTU1 and the corresponding global index ID Key1 of flow entry to VTEP 121 according to the Netconf Protocol.

VTEP 121 may maintain a correspondence table which holds the correspondence between the global index ID of flow entry and the PMTU. VTEP 121 may store the Key1 and MTU1 distributed from SDN controller 111 into the correspondence table, as in the following table 3.

TABLE 3

| Entry No | Global index ID of flow entry | PMTU |
|---|---|---|
| ⋮ | ⋮ | ⋮ |
| m | Key 1 | MTU1 |
| ⋮ | ⋮ | ⋮ |

Before executing the VXLAN flow entry distributed from the SDN controller with respect to the Packet1, VTEP 121 may query the table 3 to determine whether an entry corresponding to the global index ID Key1 of the VXLAN flow entry is included. For example, VTEP 121 queries the table 3 to find an entry corresponding to the global index ID Key1 of the VXLAN flow entry, and determines that the PMTU corresponding to the Key1 is MTU1. Then VTEP 121 may determine whether the length of the Packet1 plus the length of VXLAN encapsulation exceeds the packet length corresponding to MTU1 (for example, MTU1+14 bytes). In this example, assume that the length of the VXLAN encapsulation is 50 bytes. If the length of the Packet1 plus the length of VXLAN encapsulation exceeds the packet length corresponding to MTU1, VTEP 121 may perform fragmentation for the link layer load of the Packet1 in a fragmentation unit of (MTU1−50 bytes), so as to obtain fragmented packets. And then VTEP 121 may execute the VXLAN flow entry for the fragmented packets. On the other hand, if the length of the Packet1 plus the length of VXLAN encapsulation does not exceed the packet length corresponding to MTU1, VTEP 121 may execute the VXLAN flow entry for the Packet1.

When subsequently receiving other packets which match the flow entry of the global index ID Key1, VTEP 121 may perform the above process. VTEP 121 may determine whether to perform fragmentation for a data packet according to the length of the data packet and MTU1, and process and forward the data packet according to the VXLAN flow entry. If the VXLAN flow entry is aging, an entry comprising Key1 may be deleted in the correspondence table.

The disclosure also provides a device for transmitting a VXLAN packet which may be embodied on a SDN controller, and a device for transmitting a VXLAN packet which may be embodied on a VTEP.

Figure 5:
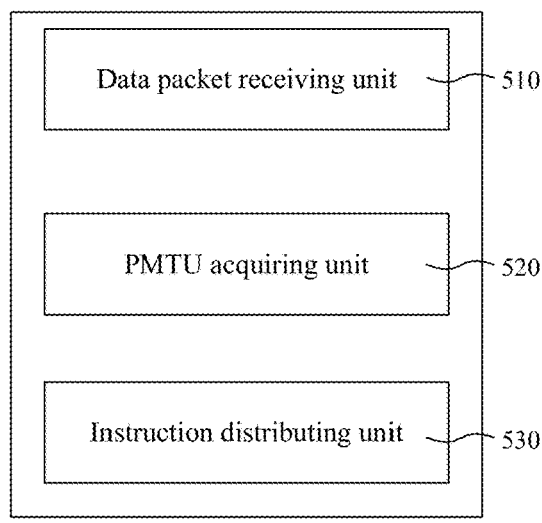
FIG. 5 is a schematic diagram illustrating a structure of a device for transmitting a VXLAN packet on a SDN controller according to an example of the disclosure.

FIG. 5 illustrates a device for transmitting a VXLAN packet embodied on a SDN controller according to an example of the disclosure. The device may functionally include a data packet receiving unit 510, a PMTU acquiring unit 520 and an instruction distributing unit 530. The data packet receiving unit may receive a data packet uploaded from a source VTEP. The PMTU acquiring unit may acquire the PMTU of the VXLAN tunnel from the source VTEP to the destination VTEP of the data packet. The instruction distributing unit may transmit a control entry to the source VTEP so as to instruct the source VTEP to: encapsulate a data packet which is to be transmitted from the source node to the destination node of the data packet into a VXLAN packet, and transmit the VXLAN packet which has a length within the packet length corresponding to the PMTU to the destination VTEP through the VXLAN tunnel.

According to an example, the instruction distributing unit may include a VXLAN flow entry distributing module and a network configuration distributing module. The VXLAN flow entry distributing module may distribute a VXLAN flow entry with a global index ID to the source VTEP according to SDN management protocol. The VXLAN flow entry may instruct an operation of encapsulating a data packet which is to be transmitted from the source node to the destination node of the data packet into a VXLAN packet and transmitting it to the destination VTEP through the VXLAN tunnel. The network configuration distributing module may distribute the global index ID of the VXLAN flow entry and the PMTU to the source VTEP according to network management configuration protocol. Before executing the VXLAN flow entry with respect to a data packet which matches the flow entry of the global index ID, if the data packet is an Over-size packet, the source VTEP may fragment the data packet into fragments, and encapsulate the fragment into a VXLAN packet which has a length within the packet length corresponding to the PMTU.

The PMTU acquiring unit may acquire the PMTU of the VXLAN tunnel from the source VTEP to the destination VTEP as follows.

The PMTU acquiring unit may distribute a control packet uploading flow entry to the source VTEP, wherein the control packet uploading flow entry may instruct an operation of uploading a received ICMP error control packet to the SDN controller.

The PMTU acquiring unit may distribute a PMTU detection flow entry to the source VTEP and start a timer, wherein the distributed PMTU detection flow entry may instruct an operation of transmitting, to the destination VTEP, a fragmentation-inhibited detection packet with a MTU of a designated length.

Before the timer expires, when receiving an ICMP error control packet uploaded from the source VTEP which indicates that the detection packet cannot reach the destination VTEP, the PMTU acquiring unit may redistribute a PMTU detection flow entry to the source VTEP and reset the timer. The distributed PMTU detection flow entry may instruct an operation of transmitting a new fragmentation-inhibited detection packet to the destination VTEP, and the fragmentation-inhibited detection packet has a MTU which is the same as the MTU carried in the received ICMP error control packet. This block is repeated until the timer expires.

If one or more ICMP error control packets are received before the timer expires, the PMTU acquiring unit may determine MTU carried in the last one of the ICMP error control packets, as the PMTU of the VXLAN tunnel from the source VTEP to the destination VTEP. If no ICMP error control packet is received before the timer expires, the PMTU acquiring unit may determine the designated length as the PMTU of the VXLAN tunnel from the source VTEP to the destination VTEP.

The PMTU acquiring unit may further acquire the PMTU of the VXLAN tunnel from the source VTEP to the destination VTEP in another way as follows.

The PMTU acquiring unit may distribute a control packet uploading flow entry to the source VTEP, wherein the control packet uploading flow entry may instruct an operation of uploading a received ICMP error control packet and a received response packet to the detection packet to the SDN controller.

The PMTU acquiring unit may distribute a PMTU detection flow entry to the source VTEP. The distributed PMTU detection flow entry may instruct an operation of transmitting a fragmentation-inhibited detection packet to the destination VTEP, and the fragmentation-inhibited detection packet has a MTU of a designated length.

When receiving an ICMP error control packet uploaded from the source VTEP which indicates that the detection packet cannot reach the destination VTEP, the PMTU acquiring unit may redistribute a PMTU detection flow entry to the source VTEP. The redistributed PMTU detection flow entry may instruct an operation of transmitting a new fragmentation-inhibited detection packet to the destination VTEP. The new fragmentation-inhibited detection packet has a MTU which is the same as the MTU carried in the received ICMP error control packet.

If one or more ICMP error control packets are received before the response packet is received, the PMTU acquiring unit may determine MTU carried in the last one of the ICMP error control packets, as the PMTU of the VXLAN tunnel from the source VTEP to the destination VTEP. If no ICMP error control packet is received before the response packet is received, the PMTU acquiring unit may determine the designated length as the PMTU of the VXLAN tunnel from the source VTEP to the destination VTEP.

In the above process, the detection packet may include an ICMP request packet, and the response packet to the detection packet may include an ICMP response packet.

According to an example, the device may further include an unimportant data flow processing unit. The unimportant data flow processing unit may, before the PMTU of the VXLAN tunnel from the source VTEP to the destination VTEP is acquired, determine whether the data packet is a data packet of an important data flow according to a predetermined condition. If the data packet is not a data packet of an important data flow, the unimportant data flow processing unit may distribute a VXLAN flow entry to the source VTEP. The VXLAN flow entry may instruct an operation of encapsulating a data packet which is to be transmitted from the source node to the destination node of the data packet into a VXLAN packet and transmitting the VXLAN packet to the destination VTEP through the VXLAN tunnel.

Figure 6:
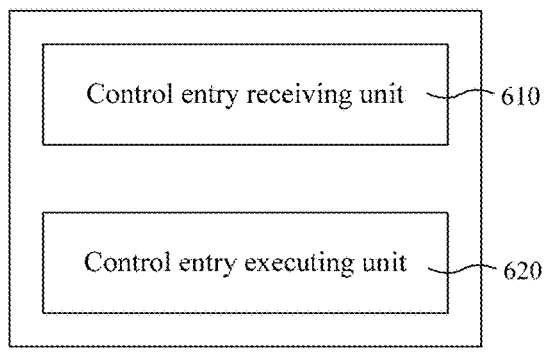
FIG. 6 is a schematic diagram illustrating a structure of a device for transmitting a VXLAN packet on a VTEP according to an example of the disclosure.

FIG. 6 illustrates a device for transmitting a VXLAN packet embodied on a VTEP according to an example. The device may include a control entry receiving unit 610 and a control entry executing unit 620. The control entry receiving unit may receive a control entry distributed from a SDN controller, wherein the control entry may include the PMTU of the VXLAN tunnel from the present VTEP to the destination VTEP. The control entry executing unit may, according to the control entry, encapsulate the data packet corresponding to the received control entry into a VXLAN packet and transmit the VXLAN packet to the destination VTEP through the VXLAN tunnel, wherein the VXLAN packet has a length within the packet length corresponding to the PMTU.

According to an example, the control entry receiving unit may receive a control entry distributed from the SDN controller as follows. The control entry receiving unit may receive a VXLAN flow entry with a global index ID which is distributed from the SDN controller according to SDN management protocol. And the control entry receiving unit may receive a PMTU and its corresponding global index ID which are distributed from the SDN controller according to network management configuration protocol. The control entry executing unit may, according to the control entry, encapsulate the data packet corresponding to the received control entry into a VXLAN packet which has a length within the packet length corresponding to the PMTU as follows. When the received data packet matches a VXLAN flow entry having the global index ID, before the flow entry is executed, the control entry executing unit may fragment the data packet as an Over-size packet into fragments, and encapsulate the fragment into a VXLAN packet which has a length within the packet length corresponding to the PMTU.

The device may further include a detection flow entry receiving unit and a detection flow entry executing unit. The detection flow entry receiving unit may receive at least one PMTU detection flow entry distributed from the SDN controller. According to the PMTU detection flow entry, the detection flow entry receiving unit may transmit a fragmentation-inhibited detection packet to a designated destination address so as to perform PMTU detection with respect to the destination address. The length of the detection packet may correspond to a designated length or be determined according to a designated rule. The detection flow entry executing unit may execute the PMTU detection flow entry. When receiving an ICMP error control packet or a response packet to the detection packet, the detection flow entry executing unit may report the reception to the SDN controller.

Figure 7:
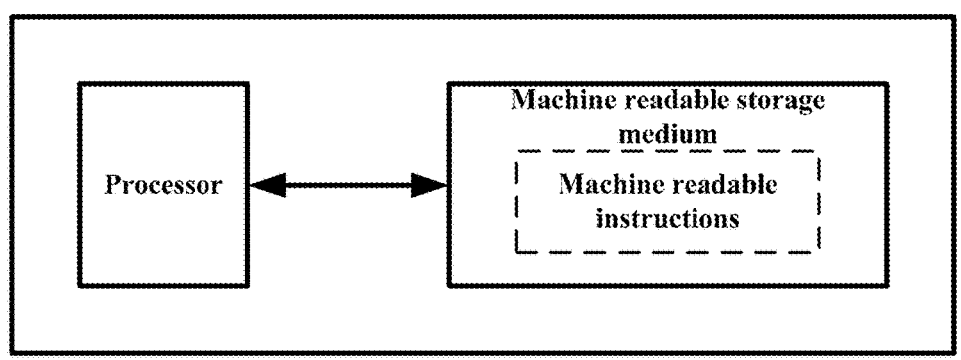
FIG. 7 is a schematic diagram illustrating a device for transmitting a VXLAN packet according to an example of the disclosure.

The above devices for transmitting a VXLAN packet may be programmable devices combining software with hardware. FIG. 7 schematically illustrates a device for transmitting a VXLAN. The device may include a machine readable storage medium and a processor.

The machine readable storage medium may store machine readable instructions which may be executed by the processor to implement functions of devices for transmitting a VXLAN packet.

The processor may communicate with the machine readable storage medium, read and execute the instructions stored in the machine readable storage medium to implement functions of the devices for transmitting a VXLAN packet.

The machine readable storage medium may be any electronic, magnetic, optic or other types of physical storage devices and may comprise or store information such as executable instructions or data, and so on. For example, the machine readable storage medium may be random access memory (RAM), volatile memory, non-volatile memory, flash memory, a storage drive (such as a hard drive), a solid state hard disk, any type of storage disk (such as optical disk and DVD) and other types of storage medium or combination thereof. Further, any type of machine readable storage medium described herein may be non-transitory.

The foregoing examples are merely illustrative but not intended to limit the disclosure, and any modifications, equivalent substitutions, adaptations, thereof made without departing from the spirit and scope of the disclosure shall be encompassed in the claimed scope of the appended claims.

The invention claimed is:

1. A method for transmitting a Virtual Extensible Local Area Network (VXLAN) packet, includes:
receiving, by a Software Defined Network (SDN) controller, a data packet uploaded from a source VXLAN tunnel end point (VTEP), wherein the data packet is to be transmitted from a source node to a destination node;
acquiring, by the SDN controller, a path maximum transmission unit (PMTU) of a VXLAN tunnel from the source VTEP to a destination VTEP of the data packet, wherein acquiring the PMTU of the VXLAN tunnel includes:
distributing, by the SDN controller, a control packet uploading flow entry to the source VTEP, so as to instruct the source VTEP to
upload a received Internet Control Message Protocol (ICMP) error control packet to the SDN controller;
distributing, by the SDN controller, a PMTU detection flow entry to the source VTEP and starting a timer, so as to instruct the source VTEP to
transmit to the destination VTEP a fragmentation-inhibited detection packet with a MTU of a designated length;
redistributing, by the SDN controller, a PMTU detection flow entry to the source VTEP and resetting the timer when an ICMP error control packet indicating that the fragmentation-inhibited detection packet cannot reach the destination VTEP is received from the source VTEP before the timer expires, so as to instruct the source VTEP to
transmit to the destination VTEP a new fragmentation-inhibited detection packet having a MTU which is the same as the MTU carried in the received ICMP error control packet; and
determining, by the SDN controller, the PMTU of the VXLAN tunnel according to
the MTU carried in the last one of the ICMP error control packets uploaded from the source VTEP if one or more ICMP error control packets are received before the timer expires, or
the designated length of the MTU in the fragmentation-inhibited detection packet transmitted from the source VTEP if no ICMP error control packet is received before the timer expires; and
transmitting, by the SDN controller, a control entry to the source VTEP, so as to instruct the source VTEP to
encapsulate the data packet into a VXLAN packet of a length less than a packet length corresponding to the PMTU, and
transmit the VXLAN packet to the destination VTEP through the VXLAN tunnel.

2. The method according to claim 1, wherein, transmitting the control entry to the source VTEP includes:
distributing, by the SDN controller, a VXLAN flow entry with a global index identifier (ID) to the source VTEP according to a SDN management protocol, so as to instruct the source VTEP to
encapsulate a data packet from the source node to the destination node into a VXLAN packet and
transmit the VXLAN packet to the destination VTEP through the VXLAN tunnel; and
distributing, by the SDN controller, the global index ID of the VXLAN flow entry and the PMTU to the source VTEP according to a network management configuration protocol, so as to instruct the source VTEP to
fragment an Over-size packet matching the VXLAN flow entry before encapsulating the packet.

3. The method according to claim 1, wherein, acquiring the PMTU of the VXLAN tunnel includes:
distributing, by the SDN controller, a control packet uploading flow entry to the source VTEP, so as to instruct the source VTEP to
upload a received ICMP error control packet and a response packet to a detection packet to the SDN controller;
distributing, by the SDN controller, a PMTU detection flow entry to the source VTEP, so as to instruct the source VTEP to
transmit to the destination VTEP a fragmentation-inhibited detection packet with a MTU of a designated length;
redistributing, by the SDN controller, a PMTU detection flow entry to the source VTEP when an ICMP error control packet indicating that the fragmentation-inhibited detection packet cannot reach the destination VTEP is received from the source VTEP, so as to instruct the source VTEP to
transmit to the destination VTEP a new fragmentation-inhibited detection packet having a MTU which is the same as the MTU carried in the received ICMP error control packet; and
determining, by the SDN controller, the PMTU of the VXLAN tunnel according to
the MTU carried in the last one of the ICMP error control packet uploaded from the source VTEP if one or more ICMP error control packets are received before the response packet is received, or
the designated length of the MTU in the fragmentation-inhibited detection packet transmitted from the source VTEP if no ICMP error control packet is received before the response packet is received.

4. The method according to claim 1, wherein, before acquiring the PMTU of the VXLAN tunnel, the method further includes:
determining, by the SDN controller, whether the data packet is a data packet of an important data flow according to a predetermined condition;
distributing, by the SDN controller, a VXLAN flow entry to the source VTEP if the data packet is not a data packet of an important data flow, so as to instruct the source VTEP to
encapsulate the data packet into a VXLAN packet and transmit the VXLAN packet to the destination VTEP through the VXLAN tunnel.

5. The method according to claim 1, further includes:
when the path of the VXLAN tunnel is changed in an underlay network, by the SDN controller, re-acquiring the PMTU of the VXLAN tunnel and instructing the source VTEP to update the PMTU of the VXLAN tunnel with the re-acquired PMTU.

6. A Software Defined Network (SDN) controller for controlling packet transmission in a Virtual Extensible Local Area Network (VXLAN), the SDN controller comprising: a processor and a non-transitory storage medium storing machine readable instructions that are executable by the processor to:
receive a data packet uploaded from a source VTEP, wherein the data packet is to be transmitted from a source node to a destination node;
acquire a PMTU of a VXLAN tunnel from the source VTEP to a destination VTEP of the data packet, wherein, for acquiring the PMTU of the VXLAN tunnel, the machine readable instructions are executable by the processor to:
distribute a control packet uploading flow entry to the source VTEP, so as to instruct the source VTEP to upload a received ICMP error control packet to the SDN controller;
distribute a PMTU detection flow entry to the source VTEP and start a timer, so as to instruct the source VTEP to
transmit to the destination VTEP a fragmentation-inhibited detection packet with a MTU of a designated length;
redistribute a PMTU detection flow entry to the source VTEP and reset the timer when an ICMP error control packet indicating that the fragmentation-inhibited detection packet cannot reach the destination VTEP is received before the timer expires, so as to instruct the source VTEP to
transmit to the destination VTEP a new fragmentation-inhibited detection packet having a MTU which is the same as the MTU carried in the received ICMP error control packet; and
determine the PMTU of the VXLAN tunnel according to
the MTU carried in the last one of the ICMP error control packets uploaded from the source VTEP if one or more ICMP error control packets are received before the timer expires, or
the designated length of the MTU in the fragmentation-inhibited detection packet transmitted from the source VTEP if no ICMP error control packet is received before the timer expires; and
transmit a control entry to the source VTEP, so as to instruct the source VTEP to
encapsulate the data packet into a VXLAN packet of a length less than a packet length corresponding to the PMTU, and
transmit the VXLAN packet to the destination VTEP through the VXLAN tunnel.

7. The SDN controller according to claim 6, wherein, for transmitting the control entry to the source VTEP, the machine readable instructions are executable by the processor to:
distribute a VXLAN flow entry with a global index ID to the source VTEP according to a SDN management protocol, so as to instruct the source VTEP to
encapsulate a data packet from the source node to the destination node into a VXLAN packet and transmit the VXLAN packet to the destination VTEP through the VXLAN tunnel; and
distribute the global index ID of the VXLAN flow entry and the PMTU to the source VTEP according to a network management configuration protocol, so as to instruct the source VTEP to
fragment an Over-size packet matching the VXLAN flow entry before encapsulating the packet.

8. The SDN controller according to claim 6, wherein, for acquiring the PMTU of the VXLAN tunnel, the machine readable instructions are executable by the processor to:
distribute a control packet uploading flow entry to the source VTEP, so as to instruct the source VTEP to
upload a received ICMP error control packet and a response packet to a detection packet to the SDN controller;
distribute a PMTU detection flow entry to the source VTEP, so as to instruct the source VTEP to
transmit to the destination VTEP a fragmentation-inhibited detection packet with a MTU of a designated length;
redistribute a PMTU detection flow entry to the source VTEP when an ICMP error control packet indicating that the fragmentation-inhibited detection packet cannot reach the destination VTEP is received from the source VTEP, so as to instruct the source VTEP to
transmit to the destination VTEP a new fragmentation-inhibited detection packet having a MTU which is the same as the MTU carried in the received ICMP error control packet; and
determine the PMTU of the VXLAN tunnel according to the MTU carried in the last one of the ICMP error control packets uploaded from the source VTEP if one or more ICMP error control packets are received before the response packet is received, or
the designated length of the MTU in the fragmentation-inhibited detection packet transmitted from the source VTEP if no ICMP error control packet is received before the response packet is received.

9. The SDN controller according to claim 6, wherein, before acquiring the PMTU of the VXLAN tunnel, the machine readable instructions are executable by the processor to:
determine whether the data packet is a data packet of an important data flow according to a predetermined condition, and
distribute a VXLAN flow entry to the source VTEP if the data packet is not a data packet of an important data flow, so as to instruct the source VTEP to
encapsulate the data packet into a VXLAN packet and transmit the VXLAN packet to the destination VTEP through the VXLAN tunnel.

10. A device for packet transmission in a Virtual Extensible Local Area Network (VXLAN), the device comprising:
a processor and a non-transitory storage medium storing machine readable instructions that are executable by the processor to:
   upload a received ICMP error control packet to an SDN controller;
   transmit to a destination VTEP a fragmentation-inhibited detection packet with a MTU of a designated length;
   upon detecting that a PMTU detection flow entry has been redistributed to the device functioning as a source VTEP and upon detecting that a timer has been reset when an ICMP error control packet indicates that the fragmentation-inhibited detection packet cannot reach the destination VTEP before the timer expires, transmit to the destination VTEP a new fragmentation-inhibited detection packet having a MTU which is the same as the MTU carried in the ICMP error control packet;
   receive a control entry distributed from the SDN controller, wherein the control entry includes a PMTU of a VXLAN tunnel from the device functioning as a source VTEP to the destination VTEP; and
   encapsulate a data packet corresponding to the received control entry into a VXLAN packet of a length less than a packet length corresponding to the PMTU and transmit the VXLAN packet to the destination VTEP through the VXLAN tunnel, according to the control entry.

11. The device according to claim 10, wherein,
for receiving the control entry, the machine readable instructions are executed by the processor to:
   receive a VXLAN flow entry with a global index ID which is distributed from the SDN controller according to SDN management protocol; and
   receive the global index ID and the PMTU which are distributed from the SDN controller according to network management configuration protocol; and
for encapsulating the data packet according to the control entry, the machine readable instructions are executable by the processor to:
   fragment, before executing the VXLAN flow entry, a received Over-size data packet matching the VXLAN flow entry into fragments, wherein each of the fragments is to be encapsulated into a VXLAN packet of a length less than the packet length corresponding to the PMTU.

12. The device according to claim 10, wherein the machine readable instructions are executable by the processor to:
   receive a PMTU detection flow entry distributed from the SDN controller,
   transmit a fragmentation-inhibited detection packet to a designated destination address according to the PMTU detection flow entry, so as to perform PMTU detection with respect to the destination address, wherein the length of the detection packet corresponds to a designated length or is determined according to a designated rule; and
   report to the SDN controller an ICMP error control packet or a response to the detection packet received during the PMTU detection.

* * * * *